Sept. 22, 1953  T. R. KOMLINE  2,652,928
ROTARY DRUM FILTER
Filed Oct. 5, 1948
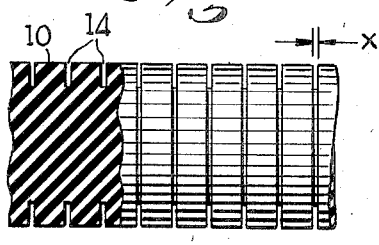
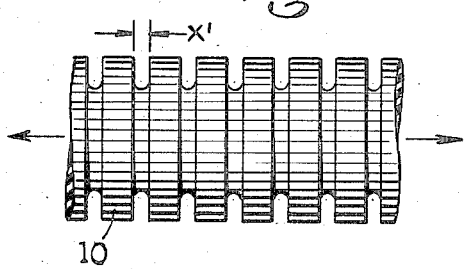
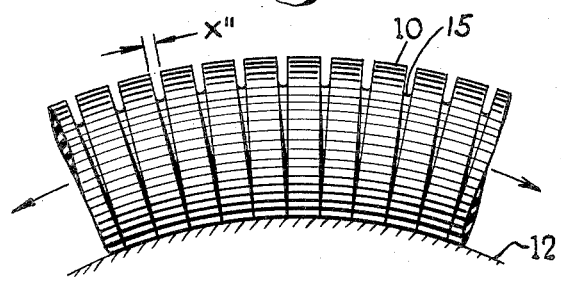
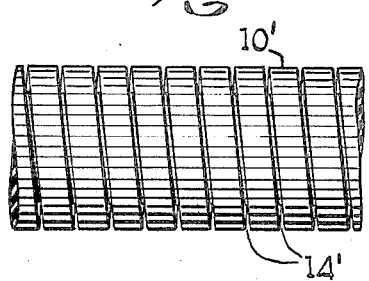
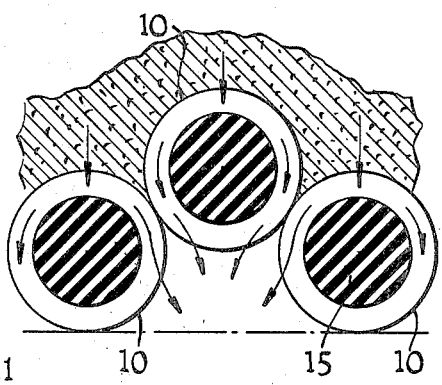
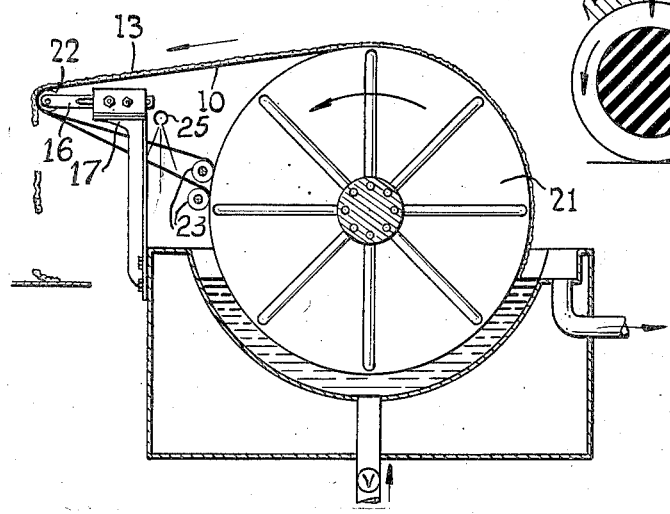
INVENTOR.
THOMAS R. KOMLINE
BY
AGENT Patented Sept. 22, 1953

2,652,928

UNITED STATES PATENT OFFICE 2,652,928

ROTARY DRUM FILTER

Thomas R. Komline, Ridgewood, N. J.

Application October 5, 1948, Serial No. 52,899

3 Claims. (Cl. 210—197)

This invention relates to improvements in media for the filtration of solids from liquids and has to do particularly with filter media applicable to the separation of solids from industrial and sewage waste materials in rotary drum filtration practice.

The present application contains subject matter similar to that disclosed in my copending application, Serial Number 32,484, filed June 11, 1948. Likewise, the filter medium of this invention may be employed as a substitute in some respects for that of my co-pending application, Serial Number 40,897, filed July 27, 1948.

In my application, Serial Number 40,897, above mentioned, I disclose a helically coiled spring filtering filament which may be used side by side with like filaments to form a web filter medium for rotary vacuum drum filters. Filtration takes place primarily between interstices which are created when the filaments are stretched or when they are disposed over a cylindrical surface. An advantage of such filaments is that they are relatively indestructible and hence form a permanent, non-clogging filter medium. The metal of the spring may be chosen for its physical and chemical properties to suit the filtration problem at hand and filtration interstices may be varied by increasing or decreasing the tension applied.

While the aforementioned filter medium is ideally suitable for problems of filtration, it is a relatively expensive structure, necessitating spring winding operations and mechanical surface finishing. Furthermore, there are limitations to the lengths which may be made with the usual spring winding machines and, for vacuum drum filters it is necessary to employ a deformable filler material placed inside of the spring in order that there may be no longitudinal flow of effluent with respect to the spring and to the segmental compartments of the filter drum.

Accordingly, the present invention provides a basic filament construction utilizing edge filtration according to the practice with springs in a less expensive and more easily fabricated material than metal. Instead of creating a filament of a helically coiled spring I substitute a plastic filament which is impervious to the flow of liquid therethrough, but which has a surface configuration similar to a spring to provide controlled liquid flow thereby. The material of the filament of my present invention may be neoprene or a similar deformable plastic capable of being stretched and which is inert insofar as the chemicals in filtration are concerned. When the filament is stretched, interstices formed at the surface thereof become separated to permit the flow of effluent, but retain solids on the surface thereof. The surface configuration may be in the form of a cylinder having transverse peripheral slots or the slots may be continuous and helical. The slot or slots may be machine cut in the surface of the filament or may be molded therein and, by reason of the facilities available in the extrusion and molding of plastics, many desirable shapes and lengths may be produced. The principal object of my invention is to provide an improved filter medium which is applicable to the filtration of solids from industrial and sewage wastes. It is a further object of the invention to provide a filter medium, consisting of a series of parallel contiguous filaments, which is relatively permanent and non-clogging. A still further object of my invention is to provide a filter medium filament which is comparatively inexpensive and which may be supplied in length or shapes appropriate to the filtration equipment with which it is used.

Other objects and advantages of my invention will be understood during a consideration of the following specification, taken in conjunction with the drawing, in which Figure 1 is a fragmentary, longitudinal elevation view, partly in cross-section, showing a filtering filament according to my invention, Figure 2 is a fragmentary, longitudinal elevation view, similar to the view of Figure 1, wherein the filtering filament is stretched along its longitudinal axis, Figure 3 is a view, similar to Figure 2, showing the filtering filament of my invention stretched by disposition about a cylindrical surface, Figure 4 is a longitudinal elevation view showing a filtration filament according to my invention having an alternative style of filtration interstices, Figure 5 is a transverse cross-section view taken through a plurality of contiguous filtering filaments showing the path of flow of effluent and the build-up of solid material thereabove, and Figure 6 is a diagrammatic view showing a continuous vacuum drum filter of the type with which the filtering filament of my invention is preferably employed.

Referring to Figure 1, I employ, as a filtering filament, a cylindrical strand-like member 10 of relatively small diameter which may be molded or extruded from a resilient, deformable, inert material such as neoprene. It is contemplated that other plastics may be substituted for neoprene, important considerations in the choice of material being the properties of stretching under tension and returning to original form when the tension is relaxed, together with resistance to chemical attack by materials being filtered. The filament is constructed with a series of narrow, parallel, circumferential grooves 14 such that only the smallest solids of filtration may enter therein, which will accumulate during filtration to the point where nothing but water may pass therethrough. When the filament is relaxed, these grooves are preferably of insignificant dimensional width and they are pitched closely together, the spacing $x$ between two adjacent shoulders being preferably less than .003 inch. When the filament is stretched, as shown in Figure 2, along the longitudinal axis, deformation will take place principally in the lands 15 under the outside surface shoulders to give a greater spacing $x'$ between the shoulders. In addition to a direct stretch, as shown in Figure 2, the filament may be disposed over a cylindrical surface 12 whereby the spacing will increase at the outside radius to dimension as $x''$, while there will be compression below the longitudinal axis to bring the shoulders together in mating contact.

As in the case of the spring filter filament of my earlier application, Serial Number 40,897, and as fragmentarily shown in Figure 5, the filaments may be used in contiguous relationship and suitably stretched to form a filter web extending between the drum heads of a vacuum filter drum. As vacuum is applied under the web the effluent will flow between the interstices from the outside of the web to the underside thereof and, depending upon the drum construction, will follow the path of vacuum to be withdrawn from the filter. The solids, not permitted to pass between the slots, will remain above the web to accumulate thereon.

Figure 4 shows an alternative style of filtering filament 10' of a like material with that of the filament 10 of Figure 1, but wherein the filtering interstices are formed by helically molding or cutting the grooves 14'. The action of this filament corresponds with that of the filament of Figure 1 with the exception that the effluent will follow a helical path rather than a path transversely out of the filament. This alternative construction more nearly simulates spring action and is advantageous for some manufacturing procedures.

Figure 6 shows, in diagrammatic form, the type of drum filter to which the filaments of my invention are preferably applied. A drum 21, suitably trunnioned, rotates while partially submerged in a tank of sludge to be filtered. As the drum turns, vacuum is applied to various segments thereof under the surface of the filter medium, carrying effluent through the medium and outwardly of the filter by way of the drum trunnion. Caked solids 13 become deposited on the surface of the filter medium and, when the web of filaments 10 leaves the drum, the solids are conveyed to the left away from the drum to be suitably discharged by reversal of the direction of the filaments 10 over a suitable discharge roller 22. Discharge roller 22 is trunnioned at its axle ends in a pair of slotted, horizontally disposed support members 16, the latter of which are adjustably secured to fixed companion brackets 17 and thus, roller 22 may be adjusted either to the right or to the left for the purpose of relaxing or stretching the filtering filaments to present a desired spacing between filament shoulders for the passage of effluent. As the filtering filaments traverse discharge roller 22, the filtration interstices at the outside radius are increased to a greater extent than at any other position during travel resulting in an increased tendency for the sludge cake to become dislodged and discharged therefrom. After traversing discharge roller 22 filaments are separated into two paths of travel, permitting them to be sprayed with water for cleaning by the spray header 25 before they are returned to the drum over the directioning return rollers 23. Suitable provision, not shown, is provided to baffle the spray water and the solids of cleaning back to the sludge tank.

While I have described and shown preferred physical embodiments of my invention, it is contemplated that other shapes, sizes and materials may be resorted to within the scope of the subjoined claims. By way of example, the cross section shape of the filament may be triangular or octagonal rather than circular. Likewise, a web formed by using a contiguous series of filaments may be made by the abutment of like or unlike cross-sectional shaped filaments, an important advantage of molding or extruding being the facility for creating irregular shapes which would add to the filtering facility, but would be difficult in metal. As a further consideration, it is contemplated that various known means may be employed to make the filaments endless for training over a drum such as by the use of ferrule connectors, or by moulding embedded screw connectors in the filament ends.

I claim:

1. In a rotary drum filter of the type described, in combination, a drum, a discharge roller, and a filtering medium disposed over the drum and discharge roller, said filter medium comprising a web of parallel, unidirectional, contiguous, plastic filaments, each filament consisting of a resilient, deformable, circumferentially slotted plastic strand.

2. In a rotary drum filter of the class described, in combination, a drum, a discharge roller, a filtering medium disposed over the drum and discharge roller, and means to space the discharge roller with respect to the drum for relaxing or stretching said filtering medium, said filtering medium consisting of a web of parallel, contiguous filaments; each filament consisting of a resilient, deformable slotted plastic cylindrical strand, said slots being peripheral of the strand and transversely disposed with respect to the longitudinal axis of the strand.

3. In a rotary drum filter of the class described, in combination, a drum, a discharge roller, a filtering medium disposed over the drum and discharge roller, and means to space the discharge roller with respect to the drum for relaxing or stretching said filtering medium, said filtering medium consisting of a web of parallel, contiguous filaments; each filament consisting of a resilient, deformable slotted plastic cylindrical strand, said slots being helically disposed with respect to the longitudinal axis of the strand.

THOMAS R. KOMLINE.

References Cited in the file of this patent

UNITED STATES PATENTS

| Number | Name | Date |
|---|---|---|
| 2,229,582 | Merrill | Jan. 21, 1941 |
| 2,233,442 | Wiley | Mar. 4, 1941 |
| 2,355,822 | Rugeley | Aug. 15, 1944 |
| 2,426,886 | Komline | Sept. 2, 1947 |
| 2,434,532 | Wurzburger | Jan. 13, 1948 |
| 2,434,533 | Wurzburger | Jan. 13, 1948 |